A. F. RIETZEL.
METHOD OF JOINING METALS.
APPLICATION FILED OCT. 2, 1906.

1,040,418.

Patented Oct. 8, 1912.

WITNESSES:

INVENTOR
Adolph F. Rietzel
BY
Townsend & Decker
ATTORNEYS.

UNITED STATES PATENT OFFICE.

ADOLPH F. RIETZEL, OF LYNN, MASSACHUSETTS, ASSIGNOR, BY MESNE ASSIGNMENTS, TO THOMSON ELECTRIC WELDING COMPANY, A CORPORATION OF MASSACHUSETTS.

METHOD OF JOINING METALS.

1,040,418. Specification of Letters Patent. Patented Oct. 8, 1912.

Application filed October 2, 1906. Serial No. 337,136.

*To all whom it may concern:*

Be it known that I, ADOLPH F. RIETZEL, a citizen of the United States, and a resident of Lynn, in the county of Essex and State of Massachusetts, with post-office address Lynn, Massachusetts, have invented certain new and useful Improvements in Methods of Joining Metals, of which the following is a specification.

My invention relates to a method of joining two pieces of metal together by the use of a third or coupling piece and by a process involving mechanical pressure together with the application of a heating electric current to raise the parts to a welding temperature.

The general object of my invention is to afford a convenient and cheap process whereby the pieces of metal may be coupled together end to end or edge to edge for any purpose, as for instance, for increasing the length of a piece of sheet metal or for the purpose of making joints between pieces of sheet metal in the construction of sheet metal utensils or for any other purpose.

Briefly stated, my invention consists in assembling the pieces to be joined in the desired juxtaposition between pressure and current supplying blocks or pieces and in engagement with a coupling piece bridging the pieces to be joined and having initial contact projections adapted to rest upon said pieces, and then forcing the contact blocks or pieces together to apply lateral pressure and to pass a heating electric current through the parts as hereinafter more particularly described.

My invention consists further in details and modifications of process above indicated and as more particularly hereinafter set forth and claimed.

Figure 1:
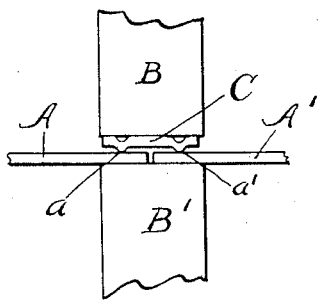
Figure 2:
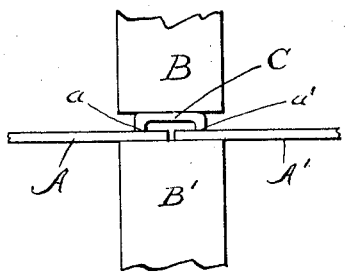
Figure 3:
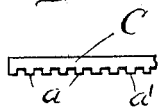
Figure 5:
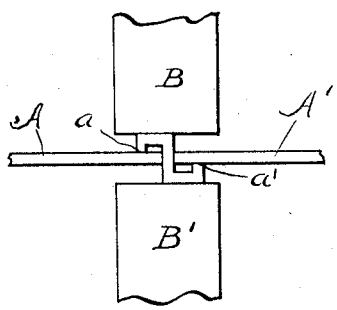
Figure 4:
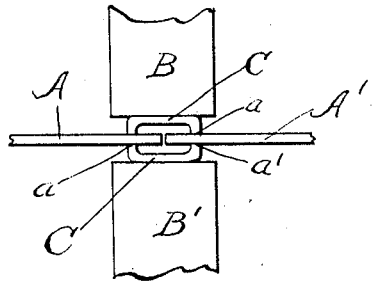

In the accompanying drawings, Figure 1 illustrates one way of assembling the work between the contact supplying and pressure producing blocks or pieces and with a coupling piece of one of the forms that may be employed. Fig. 2 illustrates a modification in the form of the coupling piece. Fig. 3 shows a modification in the form of the contact projection upon the coupling piece. Fig. 4 shows the work as assembled when the pieces are to be joined by coupling plates or pieces applied to both sides thereof. Fig. 5 illustrates the work as assembled when it is desired to produce a joint which will be perfectly water tight by the use of a coupling piece of improved form.

In the various figures of the drawings, B and B' indicate pressure blocks or pieces of any machine adapted to apply pressure to the work when located between them and also adapted to supply a heating electric current which will pass from one of said blocks or electrodes to the other for the purpose of bringing the work to the desired plastic or welding condition.

As there are many forms of machine which might be employed and as the form or shape of the blocks may be varied at will and according to the nature of the work, the same will not be described any further in detail.

Referring to Fig. 1, A, A' indicate two plates or sheets of metal to be joined in any desired juxtaposition and in actual contact with one another if desired at their edges. These may be two plates joined side to side or at the opposite edges of the same sheet or plate bent around, or may be the ends of two sheet metal strips to be joined end to end, or any other forms or pieces of metal. The coupling piece C is shown in condition or position preparatory to the application of the heating current and pressure by forcing the blocks or pieces B, B' together. Between the coupling piece and the face of the pieces to be joined suitable contacts or projections of limited contact area are provided for the purpose of localizing the heating current and raising the metal to welding temperature at such points of contact. Preferably, the contact projections are formed in or on the metal piece C, in any desired fashion. Said coupling piece C bridges or spans the dividing line between the pieces or plates to be joined and is provided, as shown, with contact projections $a$, $a'$, adapted to engage the faces of the plates or pieces B, B'. Through these contact points or projections the heating electric current passes and produces in the metal a welding temperature at such points of contact as well understood in the art. These contacts may be formed in any way and in the case of sheet metal may be made by simply indenting the piece C. The form of the contact projections may be varied thus, for instance, they may be a continuous projection extending continuously along the face of the plate A or A' parallel to its edge or each may consist of a number of points arranged in line with one another. The parts being assembled in position shown, the blocks B, B' are forced together and electric current being at the same time passed from one to the other, the contact pieces and intermediate parts are raised to welding temperature and by compression a welded union is effected between the coupling piece C and the plates A, A', said coupling sheet metal piece being forced down into intimate contact over its whole face with the faces of the plates B, B'. By this means, the parts being consolidated and placed in intimate union, a firm and tight joint is produced which is especially useful in the manufacture of pipes, sheet metal ware or other articles designed to contain liquids.

In Fig. 2 the initial contacts or projections are formed by upturning the edges of the piece C so that said edges will be presented to and make contact with the plates A, A' edge on. As more particularly indicated in Fig. 3 said edges might be serrated so that each would present a broken contact projection or one comprised of a series of projections embracing the edge. The operation obviously would be the same as in the case of a coupling piece of the form shown in Fig. 1.

Fig. 4 simply shows how the two pieces might be united by coupling plates or pieces applied at both faces of the pieces A, A'.

Fig. 5 illustrates the manner of carrying out the invention in the production of a joint in sheet metal which will be perfectly liquid tight. In this instance the pieces A, A' are assembled with their edges abutting preferably with great firmness against opposite faces of the piece C which is the coupling piece. The said coupling piece extending, as shown, between the edges of the sheets A, A' has its opposite ends or edges turned around so that they may abut edge on against opposite faces of the plates or pieces A, A' respectively. The drawing shows the parts assembled between the pressure blocks B, B'. Upon bringing the blocks closer together so as to make contact with the coupling piece and then passing electric current and also applying pressure, the coupling piece is firmly united at its projections or edges a, a' by an electric welding operation, and by the application of sufficient pressure all of the contiguous parts engaged by the pressure blocks will be consolidated or reduced or spread out upon the face of the plates or sheets A, A' so as to produce finally a joint which projects very little above the face of said plates or sheets. If the heating current be continued to bring all the parts to a welding temperature a welded union will also ensue between the edges of the sheets or plates A, A' and the face of the piece C against which said edges abut. The coupling piece being itself continuous and being thus united to the plates A, A' both at the edges of the same and upon their plane faces, it is obvious that a perfectly tight joint may be produced.

What I claim as my invention is:

1. The herein described method of joining or coupling two pieces of metal together, consisting in assembling the pieces to be joined in the desired juxtaposition between pressure and current supplying blocks or pieces and in engagement with a coupling piece bridging the line of division between the pieces to be joined and then passing heating electric current from one to the other of said blocks while localizing said current in portions of said coupling piece of limited area, and forcing the coupling piece and pieces of metal to be joined into intimate contact with one another over their opposite plane faces and welding the coupling piece to both the pieces to be joined at the same time by forcing the current supplying blocks toward one another and against the coupling piece.

2. The herein described method of joining two pieces of sheet metal edge to edge, consisting in assembling the pieces in proper juxtaposition between two current supplying pressure blocks, placing a coupling piece having upturned edges on said sheets with the faces of the sheets engaged by the upturned edges and with the coupling piece bridging the line of division between said plates, passing heating electric current from one to the other of said pressure blocks and then forcing the pressure blocks toward one another and against the coupling piece to bring the parts into intimate contact over their whole plane faces and at the same time to effect a welded union of the coupling piece and pieces to be joined coinciding with the points of initial contact formed between the upturned edges and the plane faces of said pieces at opposite sides of the dividing line between them.

3. The herein described method of coupling two pieces of metal together consisting in assembling the pieces in the desired juxtaposition between two pressure blocks forming poles of an electric circuit for heating current and in engagement with a coupling piece bridging the line of division between the pieces and engaged with the same by a comparatively limited area of contact, passing a heating electric current from one to the other of said blocks and applying pressure through the same to weld the coupling piece to both pieces at the same time.

4. The herein described method of joining two pieces of sheet metal together, consisting in assembling the pieces in proper juxtaposition between two current supplying pressure blocks, placing a coupling piece provided with upturned edges on said sheets with the faces of the sheets engaged by the upturned edges of the coupling piece on opposite sides of the line of division between said plates, passing heating electric current from one to the other of said pressure blocks and then forcing the pressure blocks toward one another and against the coupling piece to bring the parts into intimate contact over their plane faces and at the same time to effect a welding union of the coupling piece and pieces to be joined, coinciding with the points of initial contact formed between the upturned edges and the plane faces of said pieces on opposite sides of the dividing line between them.

Signed at Lynn in the county of Essex and State of Mass. this 14th day of Sept. A. D. 1906.

ADOLPH F. RIETZEL.

Witnesses:
ADA J. NICHOLS,
ARTHUR L. USHER.